United States Patent

[11] 3,628,690

| [72] | Inventor | Allen Butman Sherman<br>Pembroke, Mass. |
| --- | --- | --- |
| [21] | Appl. No. | 8,343 |
| [22] | Filed | Feb. 3, 1970 |
| [45] | Patented | Dec. 21, 1971 |
| [73] | Assignee | E. S. Ritchie & Sons, Inc.<br>Pembroke, Mass. |

[54] EXPANSION CHAMBER CONSTRUCTION
4 Claims, 3 Drawing Figs.

[52] U.S. Cl. .................................................. 220/85 B,
33/223, 138/30
[51] Int. Cl. .................................................. B65d 25/26,
G01c 17/08, F16c 55/04
[50] Field of Search .................................................. 138/30;
220/85 B, 20; 33/223

[56] References Cited
UNITED STATES PATENTS
2,845,951  8/1958  Hugley .......................... 138/30

3,003,659  10/1961  Miller .......................... 220/85 B
2,347,055  4/1944  Johnson .......................... 220/85 B UX FOREIGN PATENTS
802,702  10/1958  Great Britain .................. 138/30

*Primary Examiner*—George E. Lowrance
*Attorney*—Chittlick, Pfund, Birch, Samuels & Gauthier ABSTRACT: An expansion chamber construction for a compass includes an elastic cup-shaped member which surrounds in resting relationship a substantial portion of a split spherical fluid tight chamber structure to define a compact expansion chamber therebetween. The circular rim of the elastic cup-shaped member has integral elastic flange on which is formed an upstanding integral sealing ring. The integral elastic flange and sealing ring are adapted to be compressed in cooperation with flanged portions of the split fluid chamber to seal the chamber. A second sealing ring is preferably integrally formed around a filling hole in the elastic cup to seal the filling hole.

PATENTED DEC 21 1971

3,628,690

INVENTOR
ALLEN BUTMAN SHERMAN

BY Chittick, Pfund, Birch,
Samuels & Gauthier

ATTORNEYS

EXPANSION CHAMBER CONSTRUCTION

BACKGROUND OF THE INVENTION

In many magnetic navigation compasses, it is conventional practice to suspend a compass card in a fluid-filled sealed chamber to dampen movement of the card. The typical compass chamber is formed from a flanged transparent dome and a mated bowl which form a spherical chamber. An O-ring is normally employed to seal the dome bowl junction and a rather bulky bellows-type expansion chamber is places in a fluid communication with the sealed chamber to compensate for expansion and contraction of the dampening fluid.

SUMMARY

In accordance with my invention, a compact expansion chamber construction is provided which includes an elastic cup-shaped member having a configuration similar to but larger than the chamber walls. The chamber is nested within the elastic cup-shaped member to define an expansion chamber which closely surrounds a substantial portion of the outer chamber walls. The construction is far more compact than a conventional bellows-type expansion chamber.

The rim of the elastic cup preferably has an integral flange on which is formed an upstanding integral sealing ring. This feature of the invention eliminates the need for a separate gasket or O-ring to seal the dome bowl junction and this simplifies the assembly process to reduce the cost thereof. Moreover, by having the sealing ring and expansion chamber walls integrally formed in a single component, the over all construction is more leak resistant.

A second sealing ring is preferably integrally formed around a filling hole in the elastic cup-shaped member to further insure a simple leakproof construction.

These and further objects, features an advantages of the invention will become more apparent as the description proceeds with reference to the accompanying drawings wherein.

DESCRIPTION OF THE PREFERRED embodiment.

Figure 1:
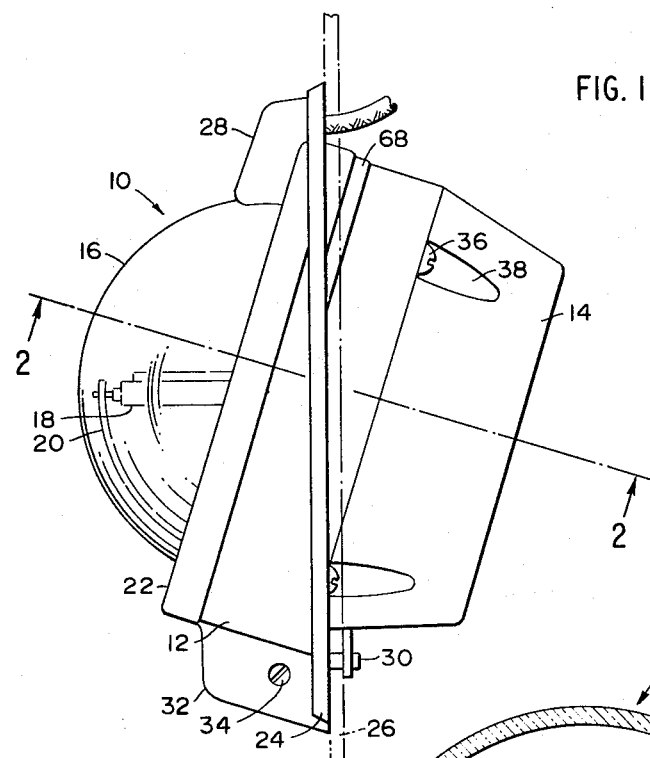
FIG. 1 is an external view in side elevation of a compass mounted to a vertical bulkhead which embodies the preferred expansion chamber construction according to the invention.

With reference first to FIG. 1, a compass embodying the concepts of this invention generally designated by reference numeral 10 has an external protective housing, preferably of molded plastic, which housing comprises a forward housing portion 12 and a rear housing portion 14. The primary purpose of the forward housing 12 is to support and expose a rigid transparent dome 16 through which a compass card 18 may be viewed. The compass card 18 is in turn pivotally mounted on a gimbal system 20 secured to a hemispherical rigid bowl in a well-known manner. The bowl is mated with the dome 16 in a manner to be hereinafter described in greater detail.

The forward housing 12 has an inwardly extending peripheral lip 22 which surrounds the exposed portion of the dome 16 to the frame the opening through which the compass card 18 is viewed. The forward housing also includes an outwardly extending peripheral mounting flange 24 which is adapted to mount the compass 10 to the vertical bulkhead indicated in dotted lines at 26. The mounting flange is preferably canted at an angle in the range of 10° to 35° from the plane of the lip 22 so as to increase the amount of overhead light falling on the compass card 18 for improved viewing thereof as more fully appears in my copending joint application with Theodore Alden Sherman for Compass filed Dec. 17, 1969 under Ser. No. 885,715.

A night light unit is supported above the dome 16 by an enclosing detachable cover 28 fixed to the housing as by screw fasteners or other conventional means. A magnetic compensator system 30 has located directly below the dome and is therein enclosed by a hump 32 formed in the forward housing portion 12. The compensator system 30 includes 4 magnets placed on two cross-shafts, the slotted ends of which protrude through holes in the hump 32 so that they may be readily revolved by a screw driver to adjust the compensation setting as shown typically at 34.

The rear portion 14 of the protective housing is secured to the forward portion 12 by bolts 36 passing through bolt holes 38 toward the forward portion 12 to threadably engage a retaining ring 68 to draw the forward and rear portions together. The retaining ring 68 is secured to the forward housing 12 in the manner described below.

Figure 2:
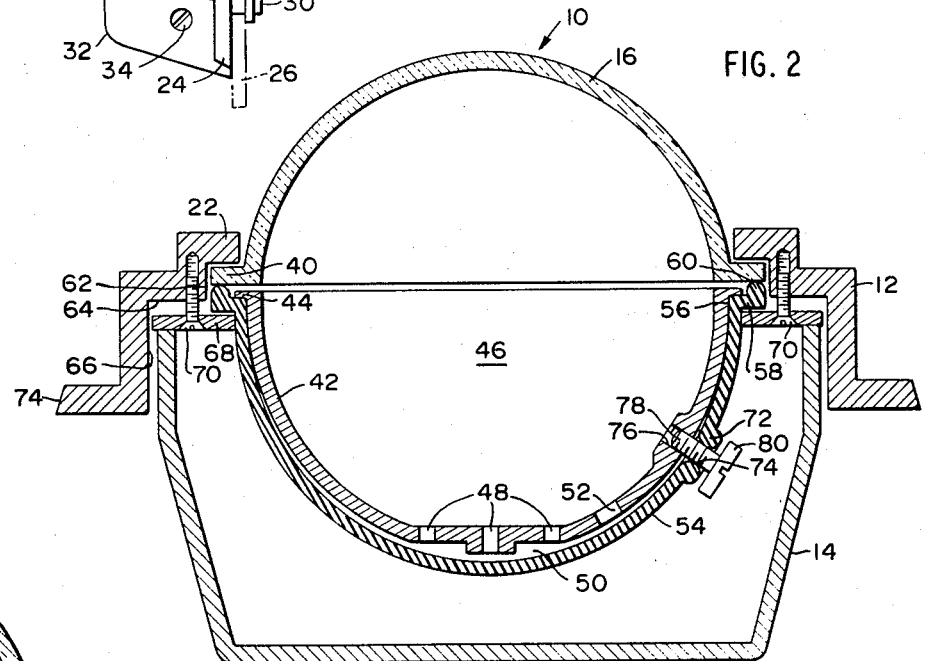
FIG. 2 is a cross section view taken along line 2—2 of FIG. 1 which shows the preferred expansion chamber construction before the seal between the bowl and dome has been completed; and, FIG. 3 is a fragmentary view of the bowl and dome after they have been drawn together to complete the seal therebetween.

The discussion will now focus on FIG. 2 where the expansion chamber construction of the compass 10 may be best seen. The dome 16 has a substantially a hemispherical configuration and is provided at its rim with a radially extending peripheral flange 40. A rigid plastic bowl 42 having substantially the same hemispherical configuration as the dome also has a radially extending peripheral flange 44 at its rim, although the outer diameter of the bowl flange 44 is less than that of the dome flange 40. It should be apparent that when the dome and bowl are mated and sealed, they comprise rigid wall members defining a fluidtight spherical chamber 46. It is conventional practice to mount the gimbal system 20 and its pivotally supported compass card 18 in a colorless fluid medium, such as compass oil, within the chamber 46 to stabilize and dampen movement of the compass card 18 for accurate compass readings. For purposes of clarity in describing the present invention the gimbal system 20 and compass card 18 are not shown in FIG. 2 although it should be appreciated that normally the gimbal system 20 is secured to the bowl 42 at gimbal mounting holes 48 in a conventional manner.

To prevent bubbles from forming in the dampening fluid confined in the chamber 46 as a result of contraction of the fluid due to decreased temperatures, and to prevent excessive fluid pressures form building up within the chamber 46 as a result of increased temperatures, the chamber 46 is placed in fluid communication with an expansion chamber 50 by an aperture 52 formed in the bowl 42. The expansion chamber is defined by an elastic cup-shaped member or bladder 54 having a configuration similar to but large than the outer surface of the bowl 42. The rim of the elastic bladder 54 is adapted to be sealed to the outer walls of the chamber 46. To this end, the rim defines a circular opening indicated at 56 having a diameter substantially the same as the outer diameter of the bowl 42 so that the bowl 42 may be nested within the elastic cup 54. The inner radius of the elastic cup-shaped member 54 progressively increases at points remote from the rim 56 so that the inner configuration of the bladder is elongated with respect to the hemispherical bowl 42 so as to define an expansion chamber 50 which closely surrounds the outer walls of the fluid tight chamber 46. The elastic cup-shaped member 54 may be fabricated from any one of a number of elastic materials. I prefer to use synthetic rubber because it is elastic enough to compensate for a wide range of temperatures, it has the requisite sealing properties and it does not discolor the dampening fluid.

The rim 56 of the elastic cup-shaped member 54 preferably is provided with an integral flange 58 extending radially outward from its circular opening beyond the outer diameter of the bowl flange 44, at which point an upwardly extending sealing ring 60 is integrally formed on the elastic flange 58. It is important to note, as shown in FIG. 2, that the uncompressed height of the sealing ring 60 is greater than the vertical height of the bowl flange 44 so that when the bowl is nested in the elastic cup-shaped member 54, the sealing ring 60 is disposed around the bowl flange 44 and extends above that flange. It is preferable to from the sealing ring 60 with an inner diameter slightly greater than the outer diameter of the bowl flange 44 so as to leave a small radial space therebetween.

Figure 3:
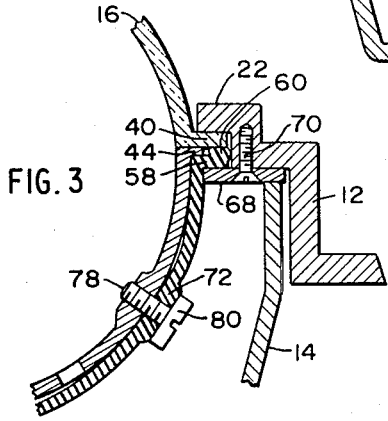

Once the bowl 42 has been nested within the elastic cup 54, the dome 16 is superimposed over this assembly to mount the dome flange 40 directly opposed to the sealing ring 60. The lip 22 and a sidewall 62 of the forward housing 12 closely conform to and receive the dome flange 40 to retain the dome 16 in this position. The sidewall 62 extends downwardly to be approximately coextensive with the lower surface of the elastic cup flange 58 when the assembly is completed as shown in fIG. 3. A shoulder 64 extends radially outwardly from the bottom of the sidewall 62 and, at the points shown in FIG. 2, at second sidewall 66 depends from shoulder 64 to nest over a rigid annular retaining ring 68. The inner diameter of the retaining ring 68 approximates the outer diameter of the elastic cup 54 at a point directly beneath the elastic flange 58 so that the elastic cup bowl assembly may be in turn nested within the retaining ring 68. When these components have been assembled as shown in FIG. 2, the seal between the dome 16 and the bowl 42 may be completed by merely compressing the sealing ring 60 against the dome flange 40 by tightening screws 70 to draw the retaining ring 68 and forward housing shoulder 66 together and hence to confine and compress the sealing ring 66 between the dome flange 40 and the retaining ring 68 to completely seal the juncture between the dome and the bowl as shown in FIG. 3. The rear housing portion 14 is then secured to the compass 10 by threading the bolts 36 (FIG. 1) into the retaining ring 68.

A further feature of the invention is the provision of a second integral sealing ring 72 formed exteriorly around a filling hole 74 defined in the elastic cup 54, which hole 74 is substantially the same size as and aligned with a threaded filling hole 76 formed in the bowl 42. Dampening fluid may be introduced into the chamber 46 through the aligned filling holes 74, 76. Once the chamber has been filled with fluid, a removable filler plug having substantially the same diameter as filling hole 72, such as screw 78, may be threaded into the bowl filling hole 76 form the position shown in FIG. 2 to that of FIG. 3 so as to compress the second integral sealing ring 72 between the head 80 of the filler plug 78 and the rigid bowl 54 to completely seal the filling hole 72.

Having thus described the preferred embodiment of the invention, the advantages achieved thereby shall be briefly reviewed. The provision of an elastic cup-shaped expansion chamber member 54 adapted to receive in nesting relationship the rigid inner bowl 42 affords a more compact expansion chamber construction than heretofore achieved with bellows-type expansion chambers. Moreover, by forming a sealing ring 60 integral with the elastic expansion chamber member 54, the need for a separate gasket or O-ring to seal the dome bowl junction is completely eliminated. This feature makes the completed structure more leakproof while also simplifying the assembly process. The leakproof characteristics of the invention are further enhanced by the provision of a second integral sealing ring 72 around the filling hole.

Although the invention has been described with reference to use in a fluid filled compass, it should be apparent that other applications thereof will be apparent to those skilled in the art. In essence the expansion chamber construction of the invention could be employed in any device wherein it is desired to provide a compact and leakproof expansion chamber construction for a fluid filled vessel. The foregoing description will, therefore, suggest many possible variations and modifications of the invention which do not depart form its spirit and scope and thus it should be understood that the invention may be practiced within the scope of the appended claims otherwise than as specifically described or illustrated.

I claim:

1. In a magnetic compass of the type having a spherical fluid filled chamber to dampen movements of a compass card mounted therein, an improved fluid chamber and expansion chamber construction comprising: a hemispherical transparent dome having a radially extending flange at its rim; a mating flanged hemispherical bowl having a radially extending flange at its rim, means defining an aperture in said bowl; and elastic cup-shaped member surrounding said bowl in nesting relationship, said elastic cup-shaped member having a configuration similar to and larger than the outer configuration of said bowl to define a compact expansion chamber therebetween, the inner rim of said elastic cup-shaped member having a circular opening of substantially the same diameter as the outer diameter of said hemispherical bowl, an integral elastic flange extending radially outward from said cup-shaped member circular opening beyond said bowl flange and an upwardly extending elastic sealing ring integrally formed on said elastic flange radially outward from said bowl flange, the uncompressed height of said elastic sealing ring being greater than the height of said bowl flange, whereby said bowl is nested within said elastic cup shaped member to from an elastic cup bowl assembly with said bowl flange resting on said elastic cup-shaped member flange and said integral sealing ring extending above said bowl flange; means for mounting said dome to said cup bowl assembly with said dome flange in opposed relationship to said bowl flange, and means for compressing said sealing ring against said dome flange to seal the junction between said bowl and dome.

2. Apparatus of claim 1 in which said compressing means comprises an annular retaining ring underlying said elastic flange opposite to the dome flange and means for drawing said retaining ring in said dome mounting means together.

3. Apparatus of claim 1 which further includes; means defining a filling hole in said elastic cup-shaped member; a second elastic sealing ring integrally formed around said filling hole; and a removable filler plug having substantially the same diameter as said filling hole, said plug including means for compressing said second elastic sealing ring when inserted in said filling hole to seal the same.

4. Apparatus of claim 1 in which said dome flange bears directly against said bowl flange.

* * * * *